D. H. PRIEST.
Fruit-Gatherer.
No. 54,594.  Patented May 8, 1866.
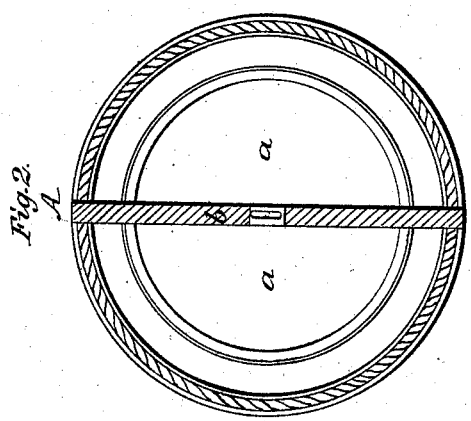
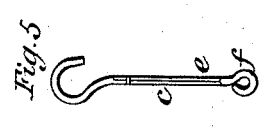
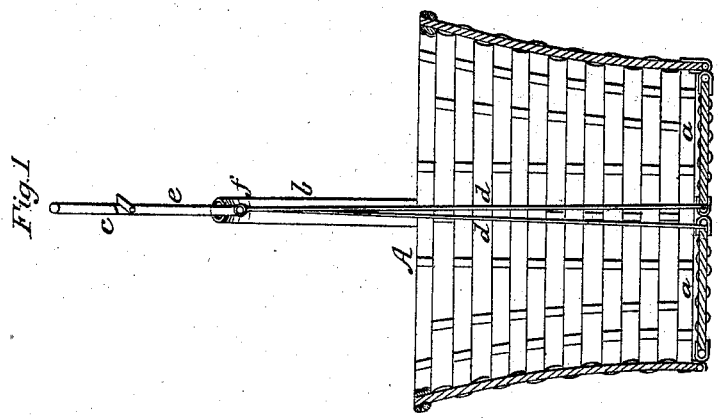
Witnesses.
J. L. Newton.
G. L. Vesty.
Inventor.
Daniel H. Priest.

UNITED STATES PATENT OFFICE.

DAVID H. PRIEST, OF WATERTOWN, MASSACHUSETTS.

IMPROVEMENT IN FRUIT-BASKETS.

Specification forming part of Letters Patent No. 54,594, dated May 8, 1866.

*To all whom it may concern:*

Be it known that I, DAVID H. PRIEST, of Watertown, in the county of Middlesex and State of Massachusetts, have invented a new and useful Fruit Gatherer or Basket; and I do hereby declare that the following is a full and exact description thereof, reference being had to the accompanying drawings, and to the letters of reference marked thereon, making a part of this specification.

Figure 1 is a vertical section of the fruit-gatherer. Fig. 2 is a top view of the same. Fig. 3 is a side view of the suspension-rod. Fig. 4 is an edge view of the same, and Fig. 5 is a section of the same.

A represents the gatherer or basket; $a\ a$, the two portions of its false bottom; $b$, the handle of the basket; $c$, the suspension-rod; $d\ d$, the ropes; $e$, its tripper or latch; $f$, its eye; $g$, its hook.

Now, in order that others may better understand the nature and use of my invention, I will proceed to explain the same.

The fruit gatherer or basket is made of willow or any material suitable for making baskets, and it has the appearance of the ordinary handle-basket; and I make my basket of any convenient size for use, in the usual way, except the bottom and the handle, which I will now explain.

It will be perceived by examining Fig. 1 that the basket has a false bottom or a bottom in two pieces, each of which swings outward on hinges which are made of the same stuff as the basket, or may be made of any suitable material. It will also be perceived that these two pieces, where the edges meet, are attached to small cords which pass upward and are fastened to the eye of the suspension-rod. The handle of the basket is like any ordinary handle, except it has a hole through the center of it, and for strengthening it it is protected by a metallic band.

The suspension-rod $c$ (seen in Figs. 1, 3, 4, and 5) consists of the several parts—namely, the tripper or latch $e$, the eye $f$, and the hook $g$. The tripper or latch is a part of the rod, cut out of the same in the manner seen in Figs. 3, 4, and 5, and swings on a pivot, as seen in Figs. 1 and 3, and when the rod is drawn up through the handle the tripper or latch is in the position seen in Figs. 1 and 3; but when the rod is let fall, so that the hook rests on the handle, the tripper being bent at the pivot in the manner seen in same figures, it takes the position seen in Fig. 1.

In order to adjust the several parts of this basket for use I first fasten the cords $d\ d$, which are of equal length, to the bottom pieces, $a\ a$, in any convenient manner. I then put the hook of the suspension-rod through the under side of the handle. I then fasten the cords to eye, the cords being sufficiently long to allow the bottom pieces to swing downward in a line with the sides of the basket.

If I wish to gather fruit from a tree, I hook the suspension-rod onto a limb of the tree or a round of the ladder. In doing this the cords fastened to the bottom and also to the rod become taut, and the bottom is in its place for service. Fill the basket with fruit, and by a cord fastened to the hook the basket may be lowered to the ground or a barrel standing under the tree; drop the cord a little, so that the suspension-rod will rest on the hook, and then draw up the basket. The end of the short arm of the latch will strike against the under side of the handle, leaving the bottom open, and the basket will be drawn up, leaving the fruit to fall out gently without bruising. The rod may then be adjusted, and the fruit of the tree may thus be deposited in barrels by the fruit-picker without his going down from the tree.

The object and utility of this invention is readily seen. Much fruit is injured and destroyed by being poured or thrown into barrels in the usual way. By the use of this basket much labor may be saved, and all injury by bruising may be avoided, and the cost of the basket will be trifling above the price of the ordinary basket. It will be of great use to market-men in sorting their fruit. The basket may be easily set into a barrel, and the contents left through the bottom of the basket without injury to the fruit.

I do not confine myself to the use of two pieces, movable, to the bottom of the basket; one piece may be stationary and the other swing outward. Neither do I confine myself to the use of basket-stuff alone. I may use also the same arrangements and the same false bottom in any metallic pail or vessel or wooden bucket used for the above purpose. I also may use the cords connecting the bottom of the basket to the suspension-rod, passing them on the outside of the basket.

What I claim as my invention, and desire to secure by Letters Patent, is—

A fruit gatherer or basket constructed substantially as and for the purposes above set forth.

DAVID H. PRIEST.

Witnesses:
J. L. NEWTON,
G. L. VESTY.